United States Patent [19]

Dighton et al.

[11] Patent Number: 4,688,370
[45] Date of Patent: Aug. 25, 1987

[54] METHOD AND MACHINE FOR FILING AND SEALING A MULTIWALL VALVE BAG

[75] Inventors: Gaylon L. Dighton, Baton Rouge, La.; Wayne R. Hutter, Midland, Mich.

[73] Assignee: The Dow Chemical Company, Midland, Mich.

[21] Appl. No.: 830,033

[22] Filed: Feb. 18, 1986

[51] Int. Cl.$^4$ ............................................... B65B 1/04
[52] U.S. Cl. ...................................... 53/469; 53/479; 53/266 R
[58] Field of Search ........... 53/373, 469, 479, DIG. 2, 53/551, 552, 281, 266 R, 282, 274, 283; 156/583.2

[56] References Cited

U.S. PATENT DOCUMENTS

| | | | |
|---|---|---|---|
| 3,016,284 | 1/1962 | Trexler | 53/479 X |
| 3,193,180 | 7/1965 | Lissner | 53/469 X |
| 3,855,907 | 12/1974 | Johnson et al. | 53/469 X |
| 4,055,456 | 10/1977 | Carnegie | 156/583.2 X |
| 4,219,054 | 8/1980 | Carter et al. | 53/469 X |
| 4,322,932 | 4/1982 | McGregor | 53/266 R X |
| 4,562,691 | 1/1986 | Rapparini | 53/552 |
| 4,594,835 | 6/1986 | Gray | 53/453 X |
| 4,604,854 | 8/1986 | Andreas | 53/552 |

Primary Examiner—Robert L. Spruill
Assistant Examiner—Steven P. Weihrouch
Attorney, Agent, or Firm—V. Dean Clausen

[57] ABSTRACT

The invention is a method and machine for filling and sealing a multiwall valve bag. The bag is fabricated with a valve structure that has at least two separated layers of a polymer composition capable of being heated by electromagnetic energy in the radio frequency range (RF energy). After the bag is filled with a product, the valve structure of the bag is clamped against a set of electrodes that are carrying the RF energy. In a very short time, the polymer layers in the valve structure will absorb enough of the RF energy to join together and thus "heat" seal the filled bag.

5 Claims, 14 Drawing Figures

METHOD AND MACHINE FOR FILING AND SEALING A MULTIWALL VALVE BAG

BACKGROUND OF THE INVENTION

This invention relates broadly to the filling and sealing of multiwall valve bags. More particularly, it concerns valve bags having a polymer composition in the valve structure that enables the bag to be sealed using electromagnetic energy in the radio frequency range (RF energy).

The various methods that are presently used to seal valve bags include resistance heating, use of an adhesive, such as glue, or use of electromagnetic energy, such as ultrasonic heating. None of these methods are entirely satisfactory as a commercial technique for sealing valve bags. For example, in sealing the valve structure by resistance heating, the high heat required for softening the polymer composition in the valve structure will frequently scorch the paper in the bag before the temperature gets high enough to soften the polymer. The use of an adhesive in the valve structure of the bag can also be undesirable, in that it may contaminate the product inside the bag. Heat sealing in the ultrasonics frequency range is sometimes undesirable because it can cause the product in the bag to overheat.

The present invention overcomes the problems described above by providing a means and method for sealing a multiwall valve bag by using electromagnetic energy in the radio frequency (RF) range to heat a polymer composition that is fabricated into the valve structure of the bag. In this technique, the properties of the polymer composition allow it to respond specifically to the RF energy range, so that there is no deleterious effect on the paper or other parts of the bag structure during the sealing step.

SUMMARY OF THE INVENTION

The invention is directed to a method and machine for filling a multiwall valve bag with a given material and sealing the valve structure of the bag with electromagnetic energy in the radio frequency range (RF energy). The multiwall bag used in this invention has a valve structure that includes at least two separated layers of a polymer composition that is capable of being heated by RF energy. The practice of the invention involves placing the bag on a filler device and filling it through the valve structure with a solid material, such as Methocel ® cellulose ether products. The filled bag is then transferred to a transporting device, which is moved to a first position to carry the bag to a sealer unit.

The sealer unit includes an RF generator and a set of electrodes, which carry RF energy supplied by the generator. A clamping device is moved to a first position to clamp the valve structure of the filled bag against the set of electrodes. The filled bag is held in this position until the polymer layers in the valve structure absorb enough RF energy from the electrodes to cause the layers to form togetner by melting. The clamping device is then moved to a second position to release the valve structure of the filled bag from the set of electrodes. The transporting device then moves to a second position which carries the filled bag away from the sealer unit. Following this step, the filled bag is removed from the transporting device.

DESCRIPTION OF THE DRAWINGS

In FIG. 2 a valve bag filled with a solid material is being transferred to a transporting device.

In FIG. 3 the filled bag is in its "rest" position on the transporting device, before the bag is moved to a sealer unit.

In FIG. 4 the filled bag is being held against a set of electrodes by a pair of jaw members, to carry out the step of sealing the valve structure of the filled bag.

In FIG. 5 the filled and sealed bag is being dropped from the transporting device onto a conveyor.

In FIG. 6 the filled and sealed bag has been deposited on the conveyor, for transport to a storage point or some other destination.

DESCRIPTION OF THE INVENTION

Figure 1:
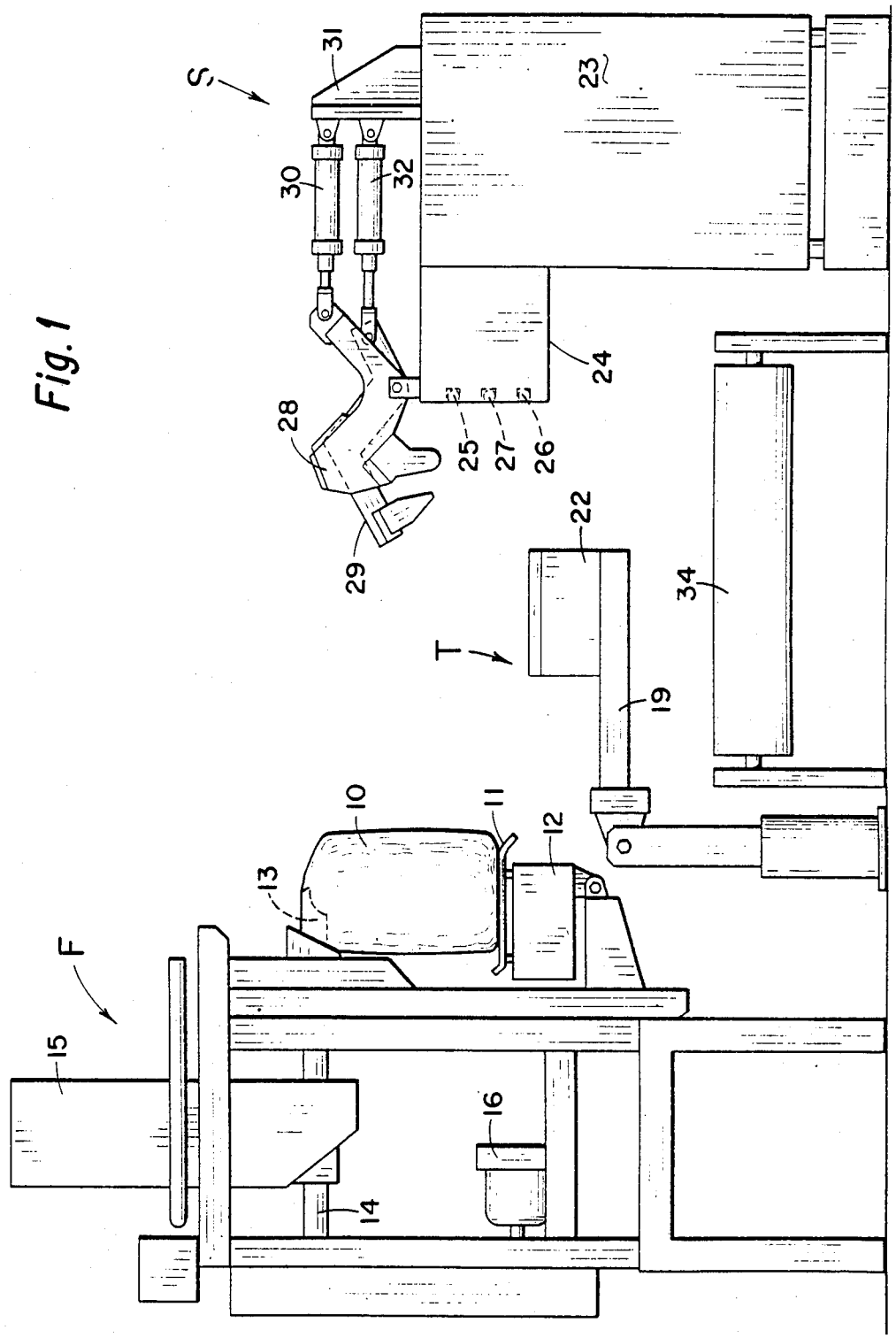
FIG. 1 is a front elevation view, mostly schematic, of the bag filling and sealing machine of this invention.

The machine of this invention is useful for filling a multiwall valve bag and for sealing the valve structure of the filled bag. Electromagnetic energy in the radio frequency range (RF energy) is used in the sealing step. Referring particularly to FIG. 1, numeral 10 indicates an empty valve bag that has been placed on a bag filling structure generally indicated by the letter F. The bag is supported on a bag chair consisting of seat member 11 that is mounted on a settler unit 12. The valve structure at the top of the bag fits over a filler spout 13.

Filler spout 13 is connected by a feeder tube 14 into a packer unit 15. In the practice of this invention, the valve bag 10 is filled with a solid material contained in the packer unit. From the packer unit 15 the solid material is conveyed through the feeder tube 14, either by a pneumatic device or by an auger-type feeder. In some operations, it is desirable to use a combination of pneumatic feed and auger-type feed to obtain a more accurate measurement of the amount of material that goes into the bag 10. The bag filling structure, indicated by the letter F, includes a motor 16 for driving the auger feeder. The feeder tube 14 is the only component of the pneumatic and auger-type feeders illustrated in the drawing.

Figure 2:
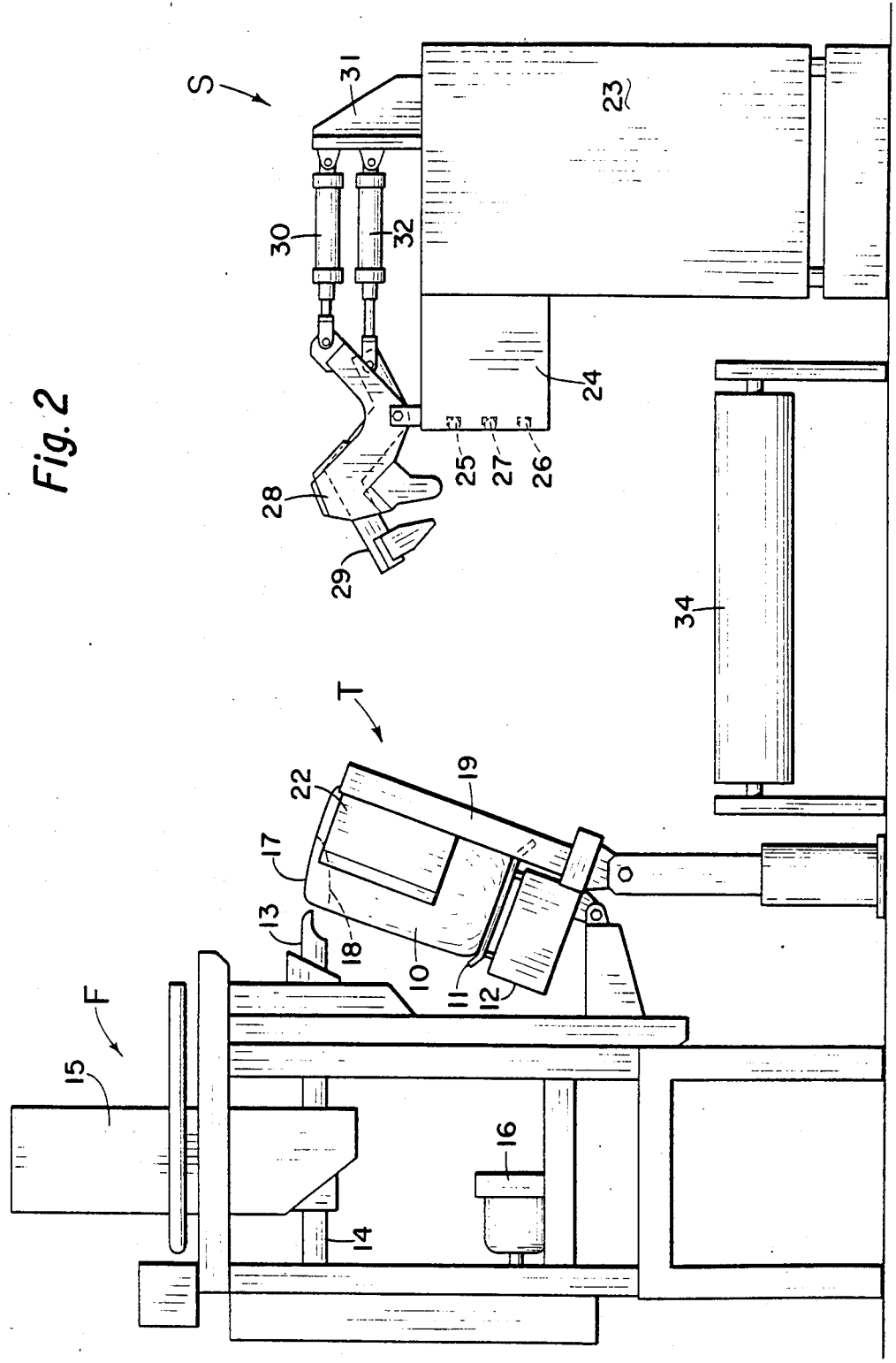
FIGS. 2-6 are each schematic views of the machine of FIG. 1. These drawings illustrate the several different phases of the bag filling and sealing operation as follows.
Figure 12:
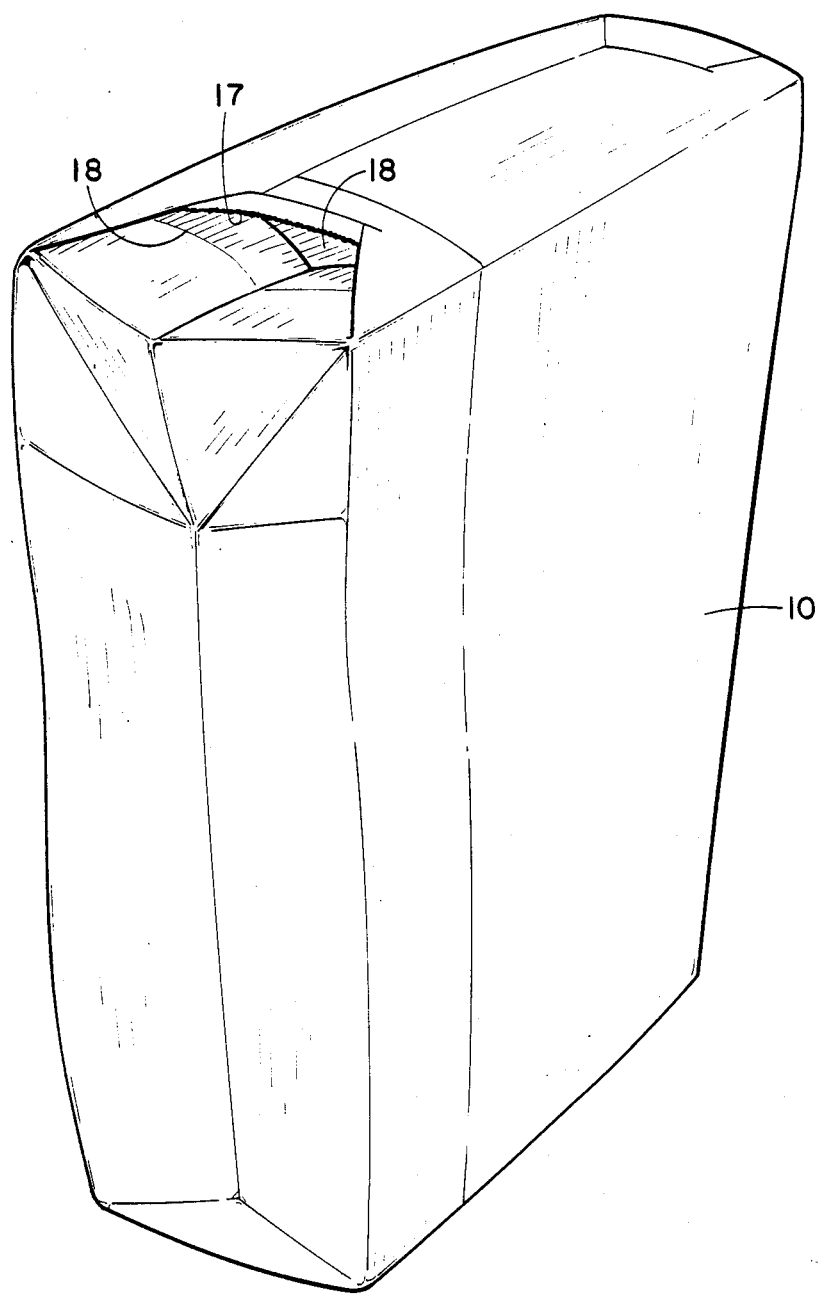
FIG. 12 is an isometric view of the valve bag of this invention. This view shows the bag as it appears before it is filled and sealed.
Figure 14:
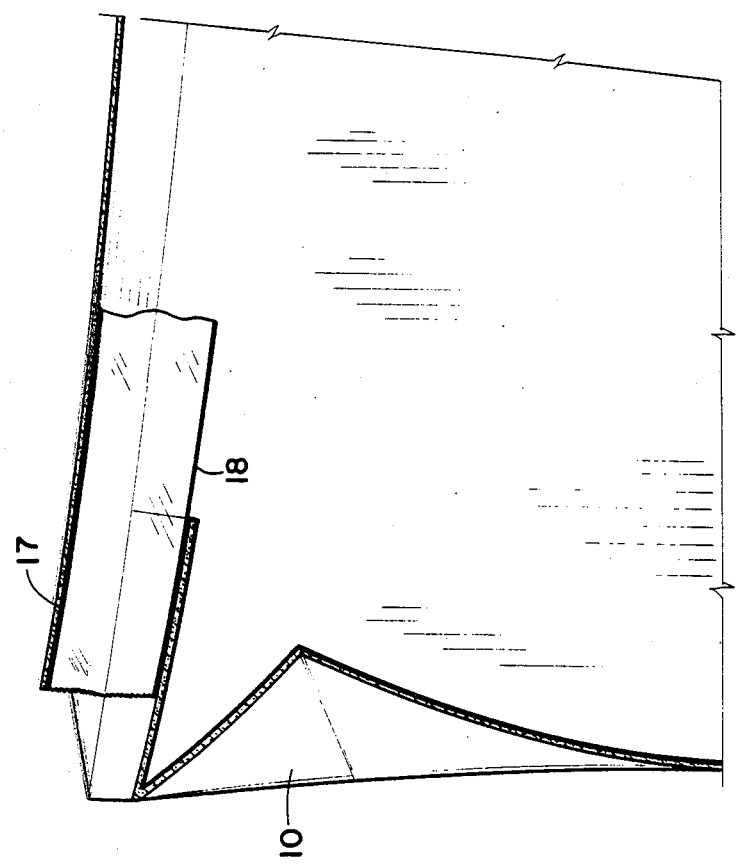
FIG. 14 is a view of the bag as taken on line 14—14 of FIG. 13.
Figure 13:
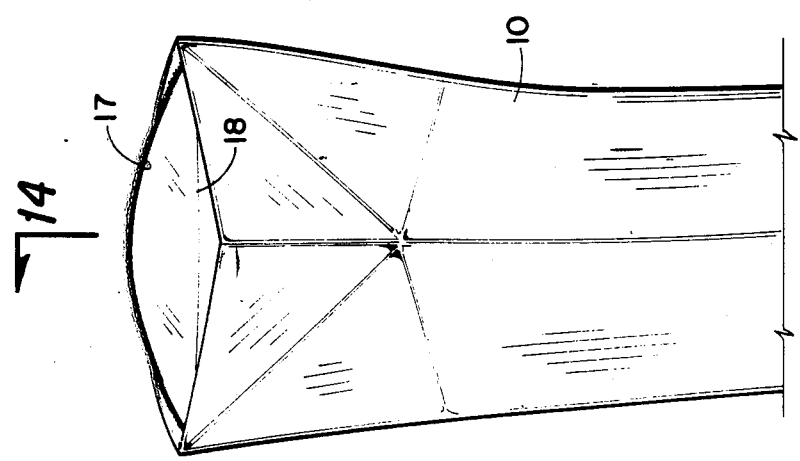
FIG. 13 is a partial front elevation view of the bag illustrated in FIG. 12, which shows only the top part of the bag.

Referring to FIG. 2, the valve structure of bag 10 is an opening at the top left hand corner of the bag (as viewed in FIG. 2). As shown in FIGS. 12, 13 and 14, the opening is generally defined by a liner material consisting of two separated layers, indicated by numerals 17 and 18, of a polymer composition capable of being heated by RF energy. While the bag 10 is being filled, the settler device 12 can be vibrated with electronic controls (not shown) to aid in packing down the material in the bag. During the filling step the bag is also being weighed by the electronic control system (not shown) that includes a microprocessor (not shown). When the weight reaches a pre-set point, indicating that the bag is full, the control system tilts the bag chair towards a transporting device as indicated by the letter T. As the filled bag 10 is being tilted, the transporting device T swings upwardly to a position where it can receive the filled bag 10.

Figure 3:
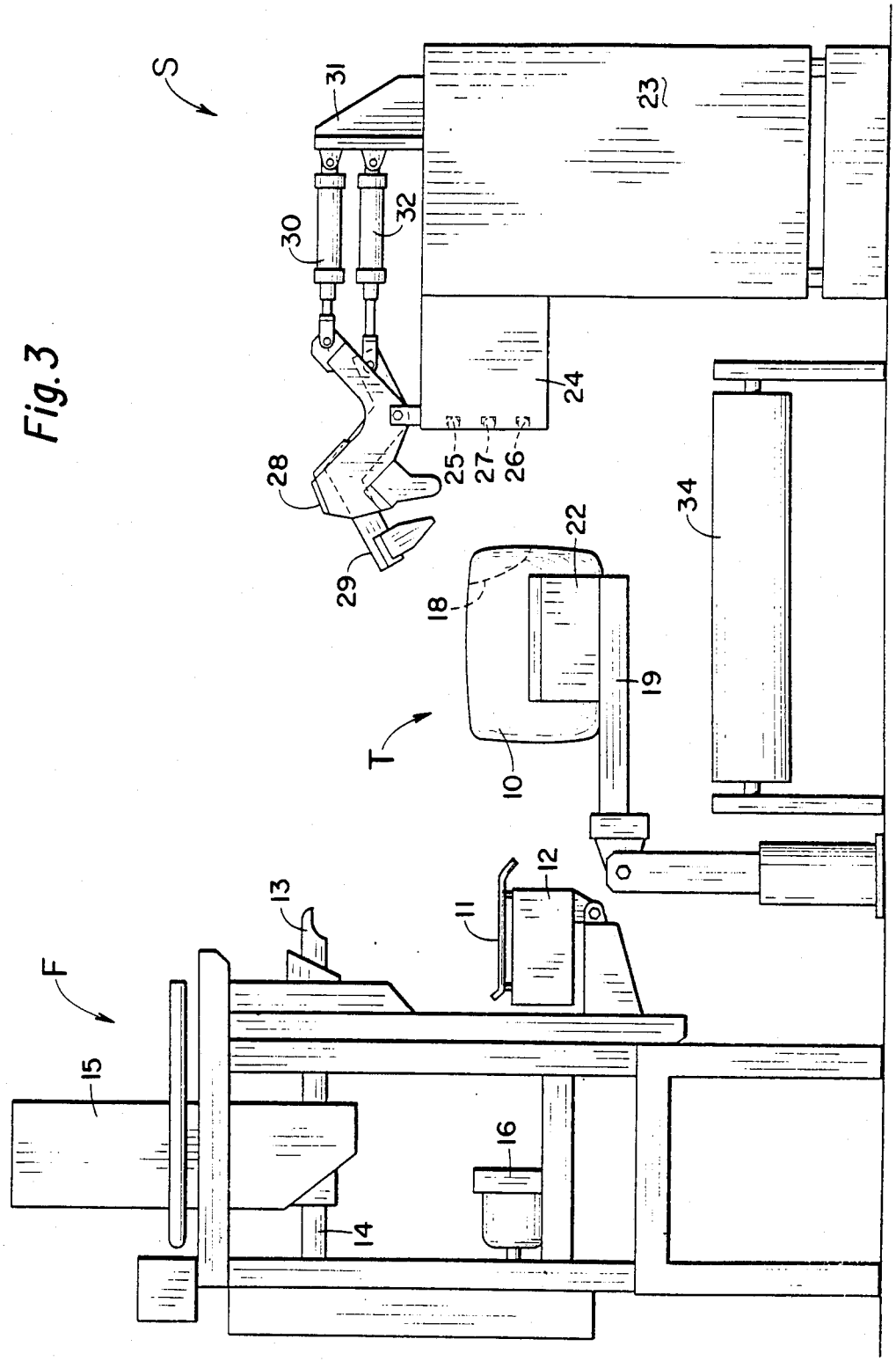
Figure 4:
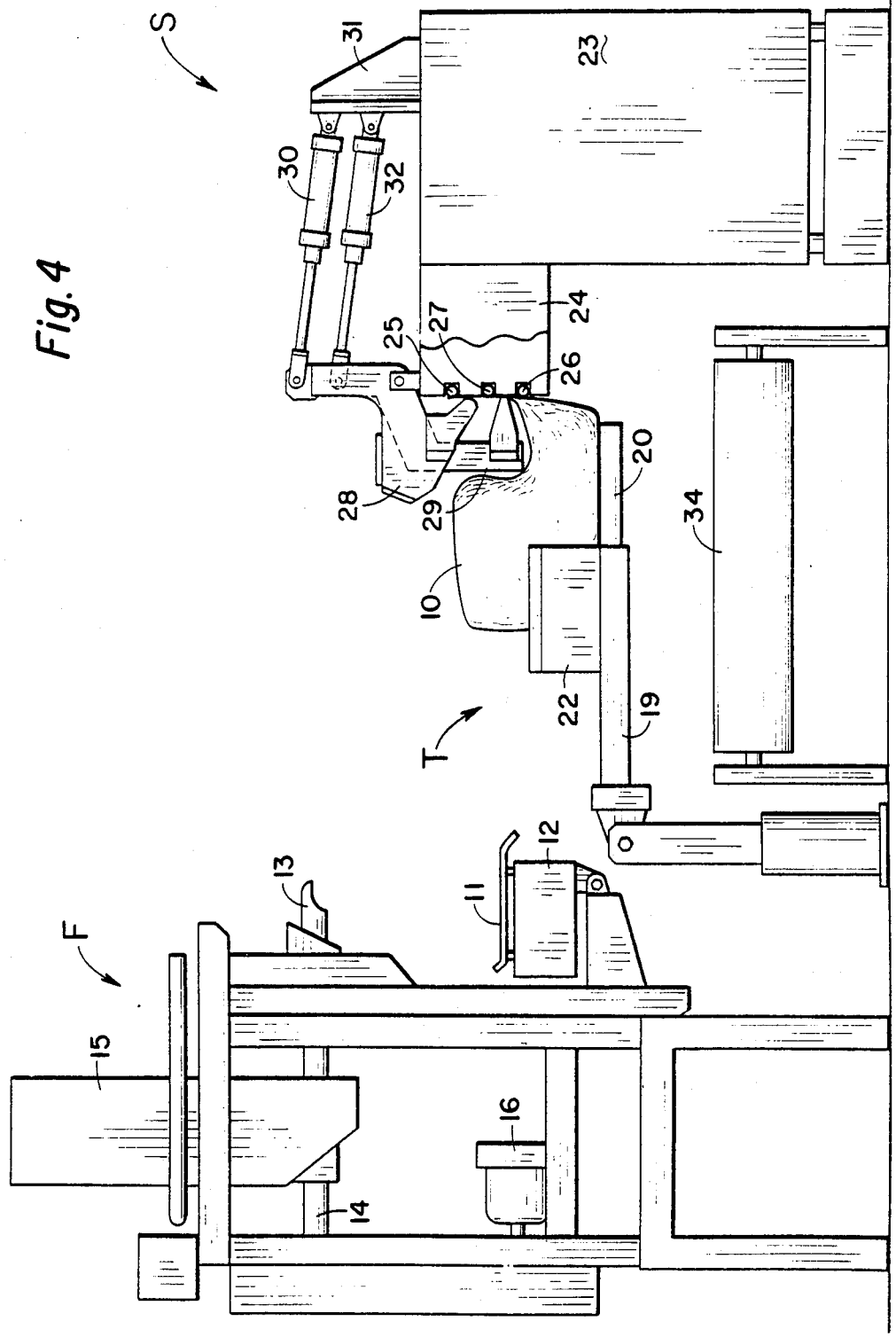

Basic components of the transporting device T include a frame structure 19, with a movable deck 20 mounted inside the frame. The transporting device also includes a pair of bag retainer members 21 and 22, which are mounted opposite to each other on the frame (see FIG. 11). After the filled bag 10 is transferred to the transporting device T, this device lowers to a horizontal position, as shown in FIG. 3. As the filled bag sits on the transporting device T, it rests on one edge, with the valve structure located at the right front corner of the bag. In the next sequence, the electronic control system causes the deck 20 to slide forward from the frame structure 19 to move the filled bag 10 up to a sealer unit, as generally indicated by the letter S.

Referring particularly to FIGS. 7, 8, 9 and 10, the sealer unit is made up of several components. One of these components is a radio frequency (RF) generator 23. A sealer head 24 is mounted on the front side of the RF generator and a stray field electrode set is mounted on the front surface 24a of the sealer head. The top and bottom electrodes, as indicated by numerals 25 and 26, respectively, are the ground electrodes. Between the ground electrodes is the "hot" electrode 27. The sealer unit also includes a pair of bag clamping jaws indicated by numerals 28 and 29, which are mounted pivotally on the top side of the sealer head 24.

Movement of the upper jaw 28 is controlled by an air cylinder 30 that connects jaw 28 to an anchor bracket 31 mounted on the RF generator 23. Movement of the lower jaw 29 is controlled by air cylinder 32 that connects the jaw to bracket 31. Operation of the air cylinders is controlled by solenoid-operated valves (not shown), which are part of the electronic control system. As the filled bag 10 is moved toward the sealer head 24, it engages a momentary pulse limit switch (not shown) when the bag reaches a point very close to the front surface 24a of the sealer unit. The pulse initiated by the limit switch signals the microprocessor in the electronic control system to have the jaws close onto the bag to seal the valve structure.

Figure 7:
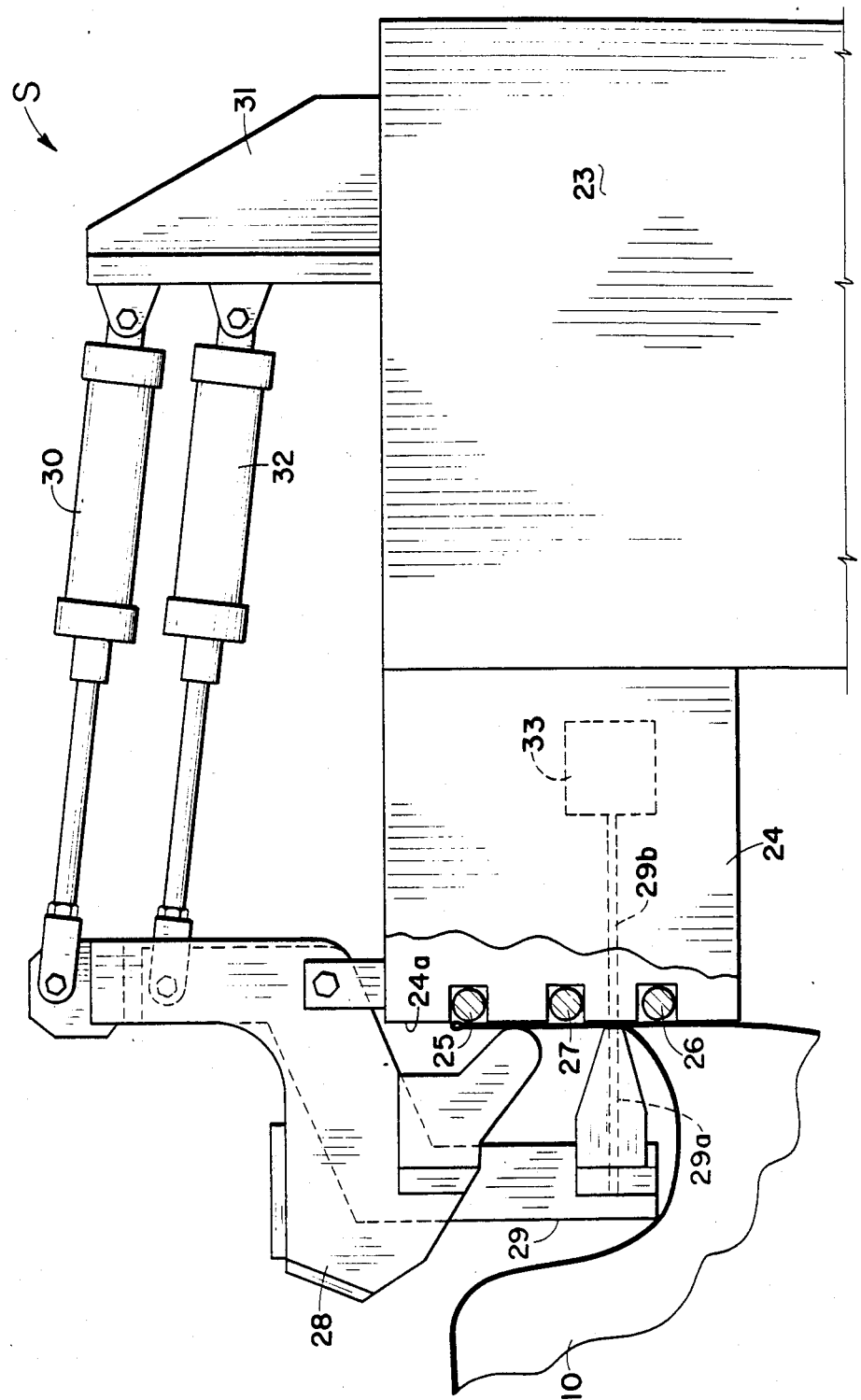
FIG. 7 is an enlarged, fragmentary view of the bag sealer machine as shown in FIG. 4. This drawing illustrates in greater detail how the jaw members, in their closed position, hold the filled bag against the electrodes during the sealing step.

When upper jaw 28 moves downwardly toward the front surface 24a of the sealer head 24, it mechanically engages jaw 29, thus causing jaw 29 to partially close against the sealer head. As jaw 29 moves against sealer head 24, it pushes the valve structure of the filled bag 10 up against the electrodes on the sealer head, as best shown in FIG. 7. With jaw 28 in its "closed" position, air cylinder 30 is fully extended. In this position, air pressure builds up on cylinder 30 and trips an air pressure switch connected by an air line to the cylinder. The air pressure switch and the air line are not shown in the drawing.

Figure 8:
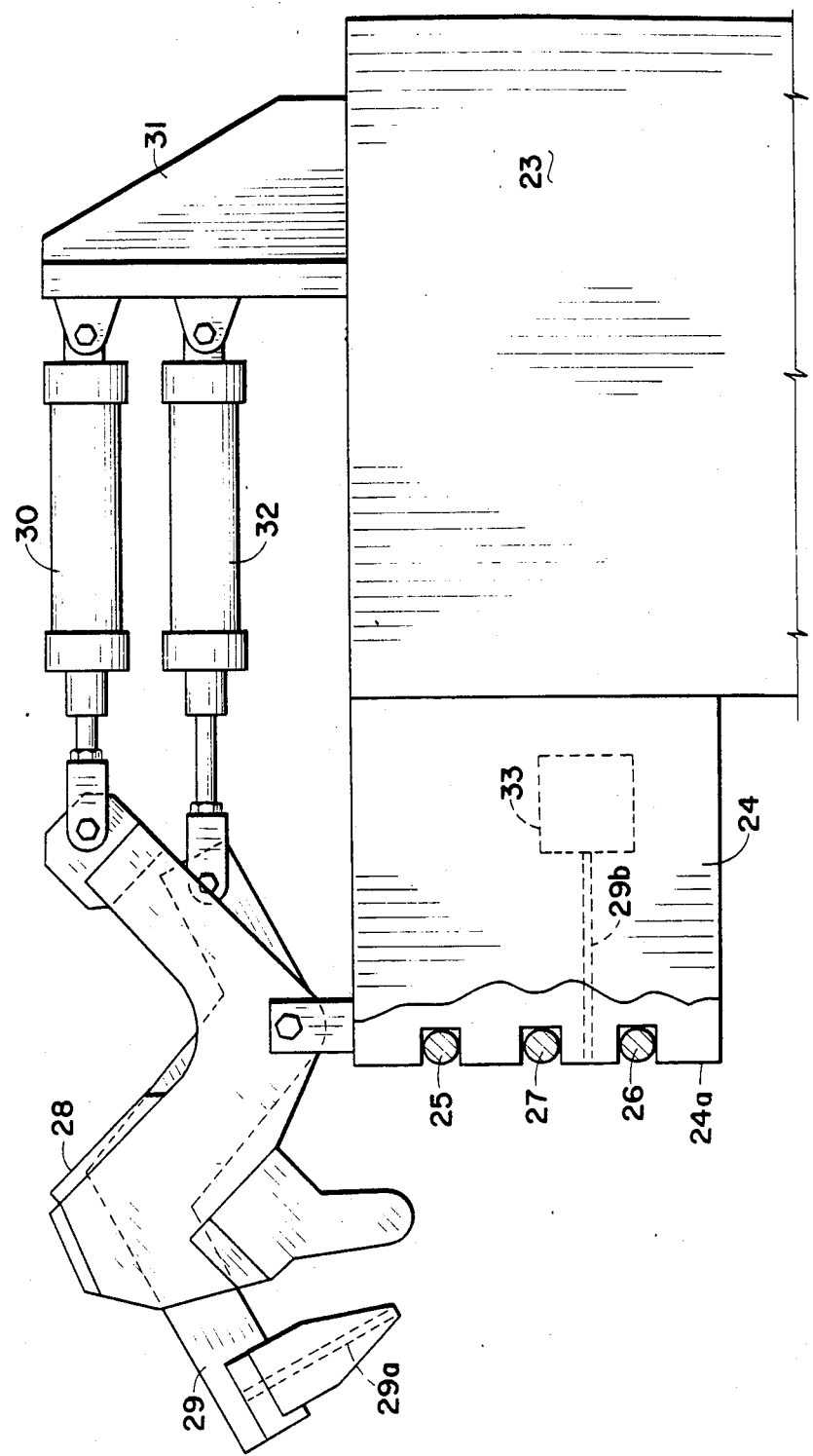
FIG. 8 is a detail view similar to FIG. 7, but it illustrates the jaw members in their "release" position after the filled bag has been sealed.
Figure 9:
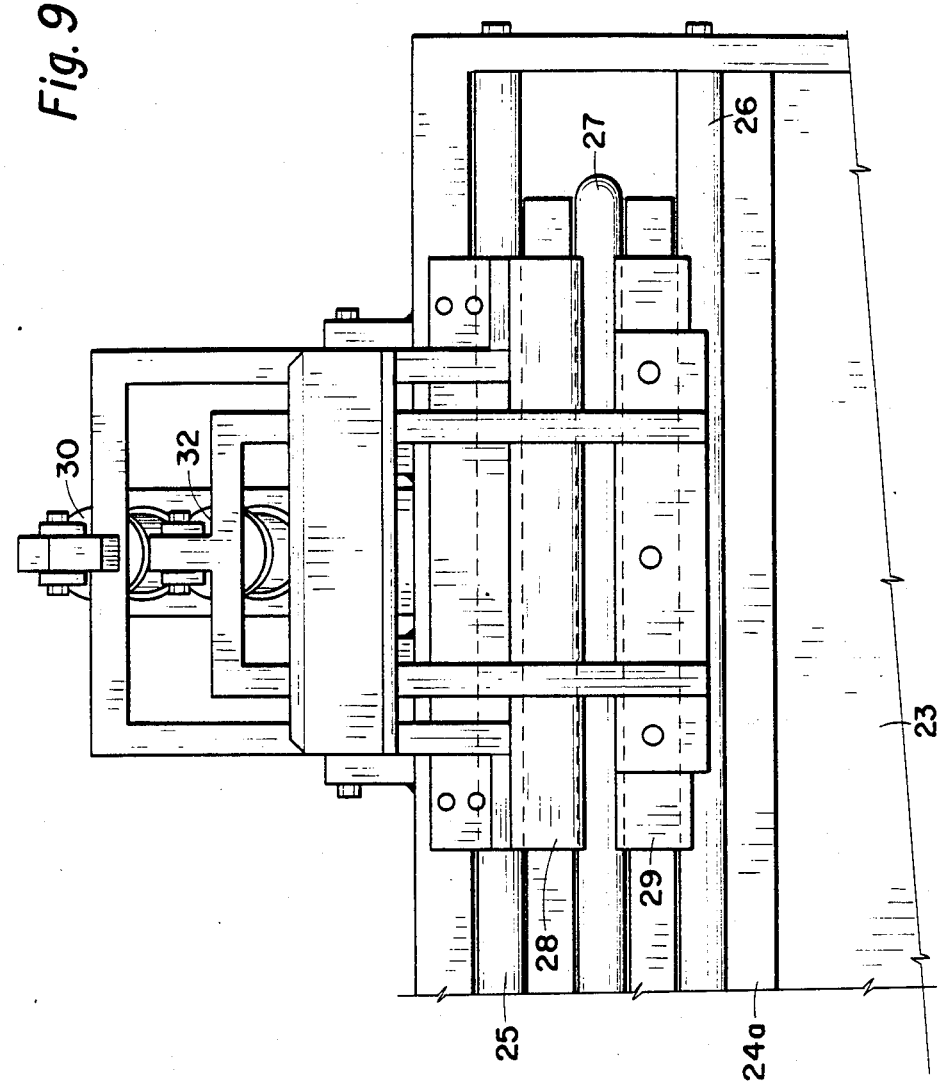
FIG. 9 is a front view of the sealer unit shown in FIG. 7. This view illustrates how the jaw members, in closed position, look from a position in front of the sealer unit.
Figure 10:
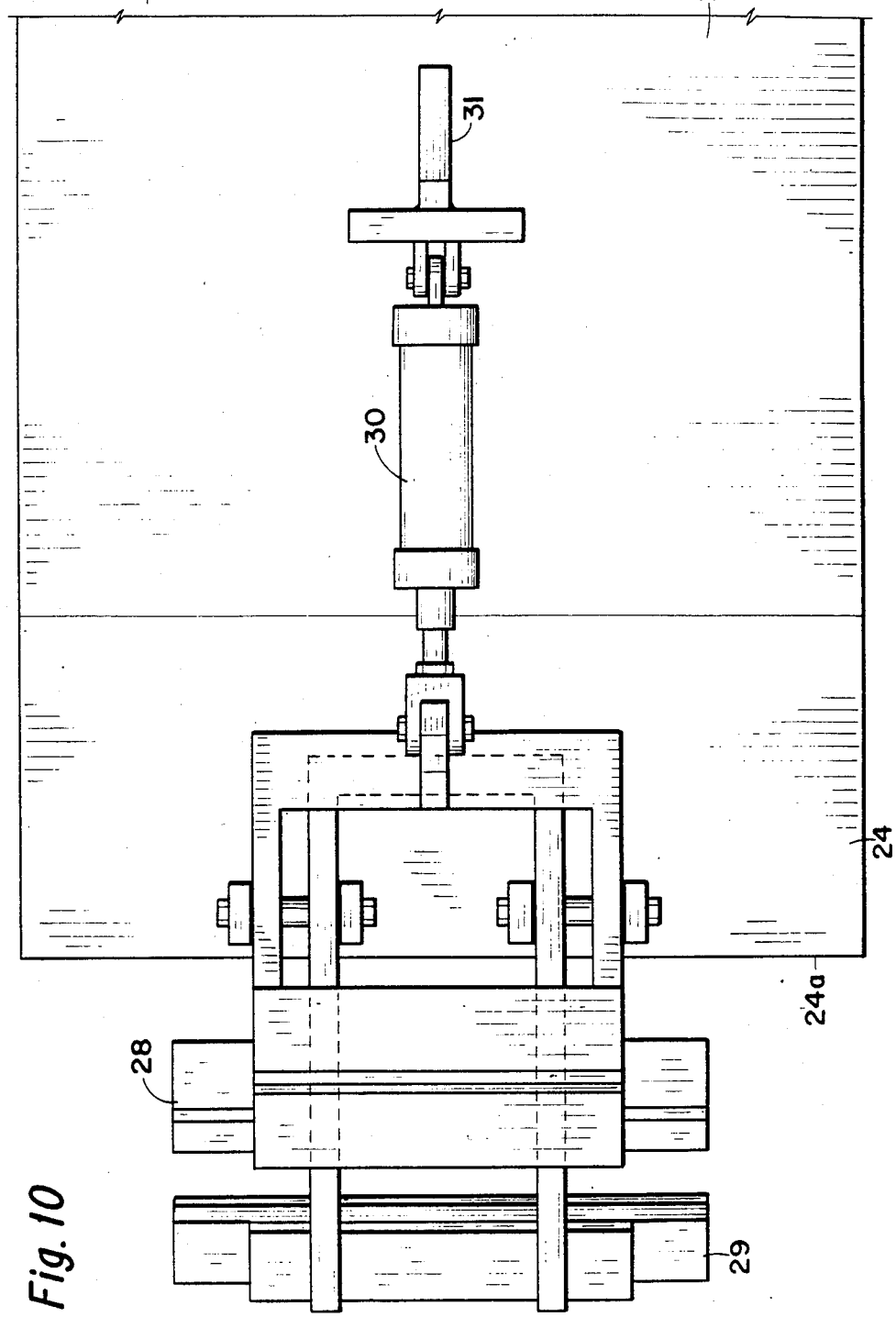
FIG. 10 is a plan view of the sealer unit, shown in of FIG. 8. In this view the jaw members of the sealer unit are in their open position.

Following this sequence, the air pressure switch signals the microprocessor to fully extend air cylinder 32, which causes lower jaw 29 to further clamp the valve structure of bag 10 against the electrodes 26 and 27. Referring particularly to FIGS. 7 and 8, jaw 29 defines a nozzle structure that includes an air passage section 29a, which extends lengthwise through the nozzle. When air cylinder 32 is fully extended, the air passage section 29a is in registry with an air passage section 29b, which extends into the sealer head 24. At the opposite end of air passage section 29b the air passage connects into an air sensor pressure switch 33.

The corresponding drop in air pressure to switch 33 signals the RF generator 23 to begin the heat cycle. Generator 23 initiates the heat cycle by applying a voltage across the stray field electrodes 25, 26 and 27, of from about 1.0 to 5,000 volts at a frequency range of 1.0 to 300 MHz. As a specific example for sealing a valve bag according to this invention, the RF energy absorbed by the polymer composition layers in the valve structure of the bag is at a frequency of 40.65 MHz. The actual amount of voltage applied in the heat cycle will depend on the thickness of the layers of the polymer composition in the valve structure of filled bag 10. In the practice of this invention, the thickness of the polymer layers can be from about 0.5 to 20 mils and the usual range is from about 2.0 to 5.0 mils.

At the end of the heat cycle, which is controlled by a heat cycle timer in the electronic control system (not shown), there is a slight dwell time in which the jaws 28 and 29 are held in the closed position shown in FIG. 7. A delay in opening the jaws provides a cooling cycle, and it prevents the jaws from opening while the RF energy is passing through the electrodes. When the dwell cycle is finished and the polymer layers 17 and 18 have been joined together by melting, the air cyclinder 32 retracts and pulls jaw 29 upwardly and away from the electrodes. This action also pulls jaw 28 upwardly and retracts air cylinder 30, so that both jaws return to their open position, as shown in FIG. 8.

Figure 5:
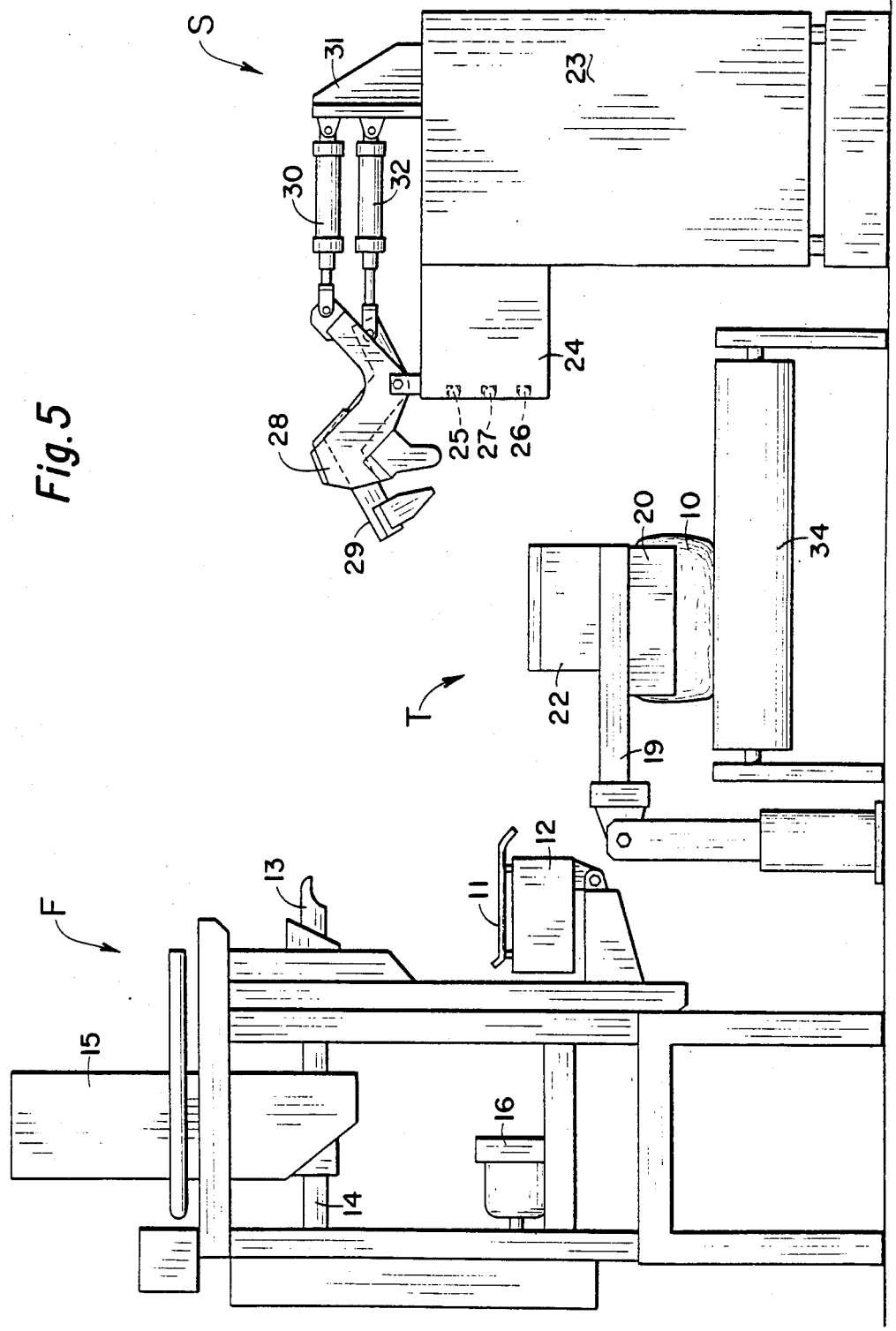
Figure 6:
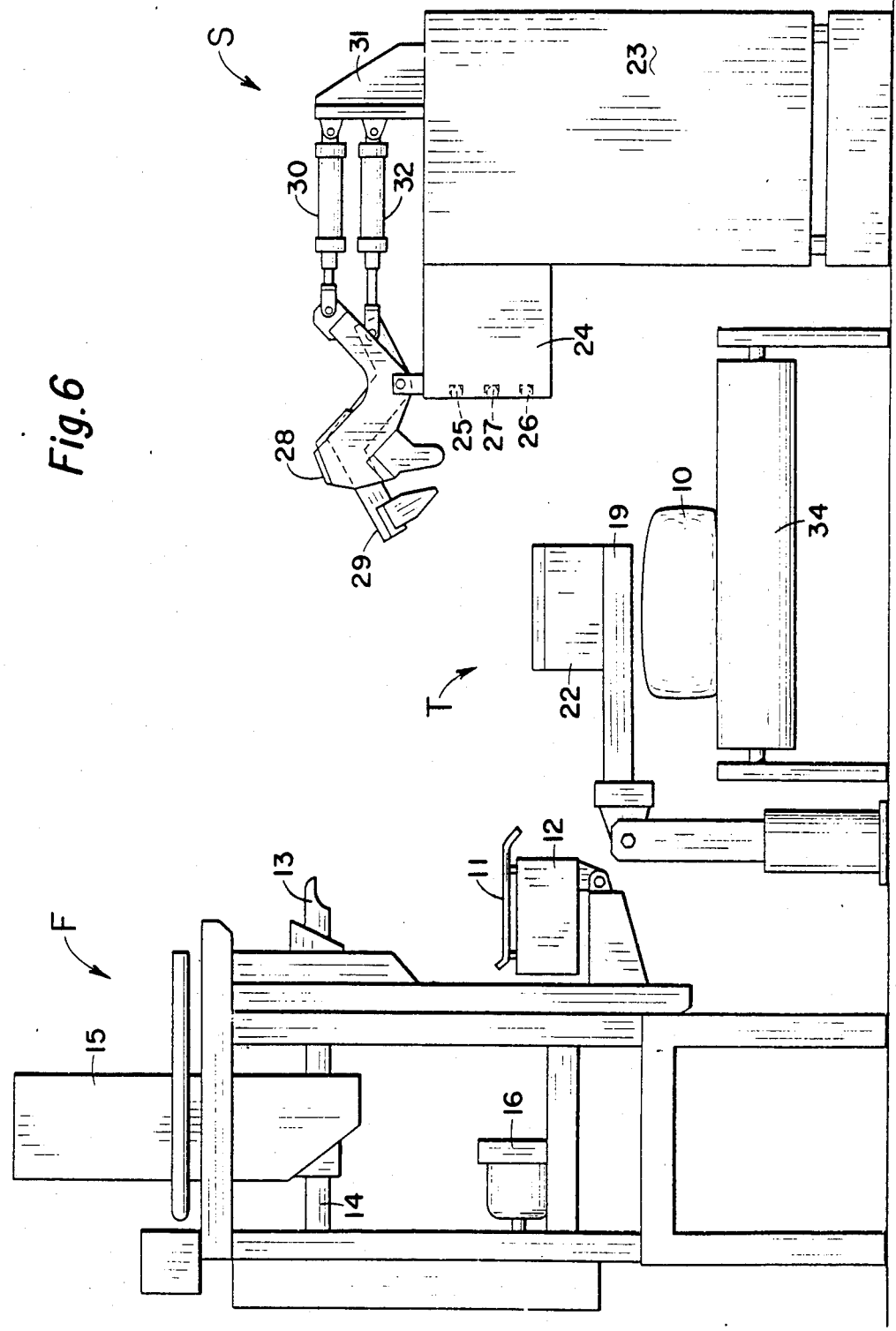
Figure 11:
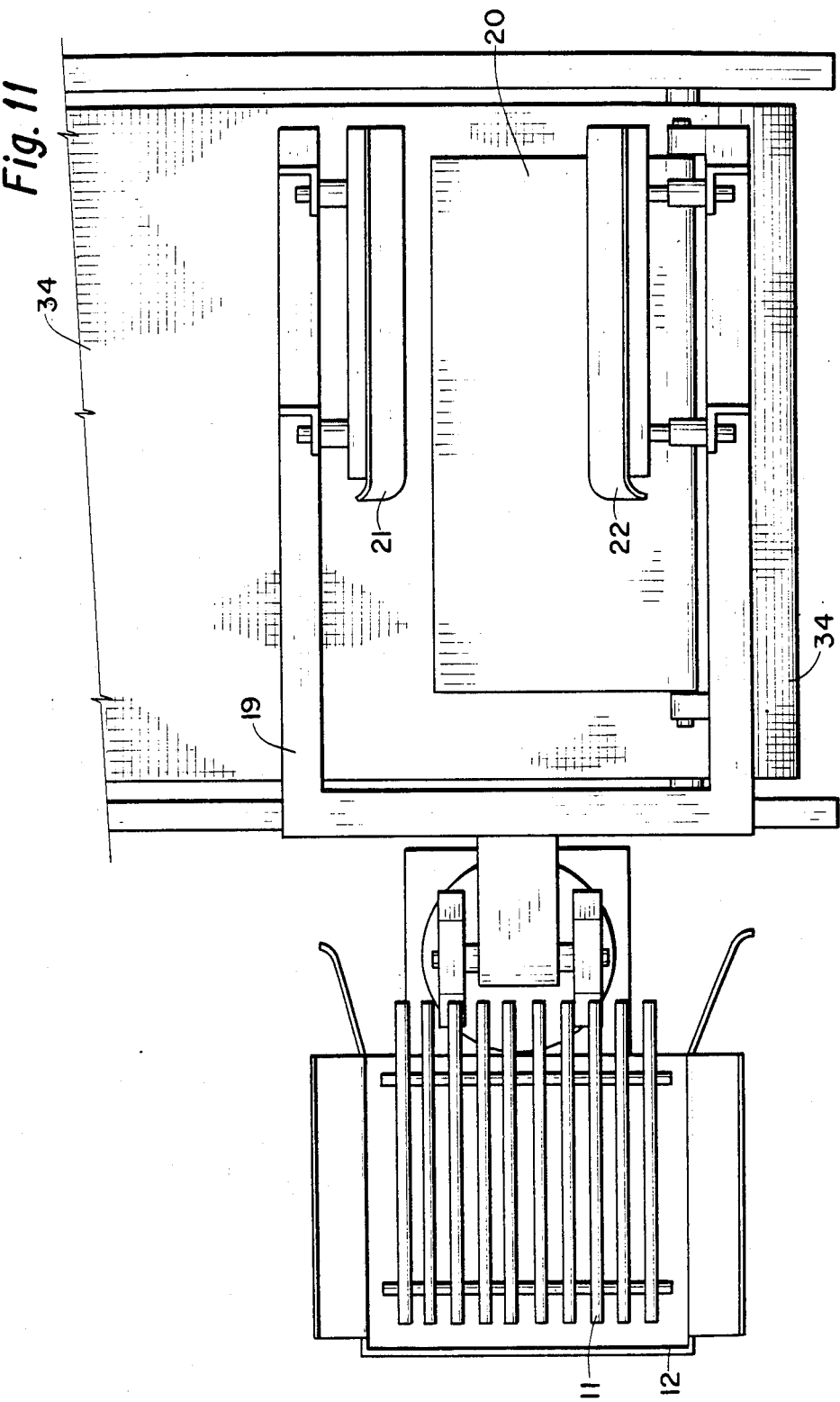
FIG. 11 is a plan view of a part of the bag filling and sealing machine. The components illustrated in this view include a bag chair and settler device, a transporting device and a conveyor.

Looking now at FIGS. 5, 6 and 11, the next sequence in the operation is to remove the filled and sealed bag from the sealer head 24. To do this, the electronic control system retracts the movable deck 20 to its original position inside of frame 19, so that the filled and sealed bag 10 is carried back to the position illustrated in FIG. 3. The control system then swings the deck 20 downwardly (FIG. 5) to drop the filled bag onto a moving conveyor 34. In a continuous operation, as each bag is dropped onto the moving conveyor, it is carried to another point (not shown) for stacking on pallets or whatever operation is desired.

The bag filling unit F and the transporting device T, that were used in the practice of this invention, are conventional devices manufactured by W. G. Durant Corporation of Placentia, Calif. But the invention is not restricted to the use of this equipment. Any conventional equipment suitable for filling and transporting a valve bag may be used. The sealer unit S is a piece of equipment that was specifically designed for the bag sealing step in this invention, and the unit is manufactured by Radio Frequency Company, Inc., of Millis, Mass.

As described earlier in this specification, the liner material that defines the opening in the valve portion of bag 10 consists of separated layers 17 and 18 of a polymer composition capable of being heated by RF energy. Polymer compositions that may be used in the practice of this invention are described in U.S. application Ser. No. 738,008, filed May 28, 1985. This application is copending herewith and assigned to the present assignee, and the subject matter of the application is incorporated herein by reference. These polymer compositions include ethylene copolymers having pendant reactive groups, olefin polymers having pendant halogen groups, nylons, and carbon monoxide-containing ethylene polymers.

The invention claimed is:

1. A method for filling a multiwall valve bag and for heat sealing the valve structure of the filled bag, using electromagnetic energy in the radio frequency range (RF energy) in the sealing step; the method comprises the steps of:

providing a valve bag in which the valve structure of the bag includes at least two separated layers of a polymer composition capable of being heated by RF energy;

placing the valve bag on a filler device;

filling the valve bag through the valve structure with a given material;

transferring the filled bag from the filler device to a transporting device;

moving the transporting device to a first position to carry the filled bag to a sealer unit, the sealer unit includes an RF generator and a set of electrodes, the electrodes carry RF energy supplied by the RF generator;

moving a clamping device to a first position to clamp the valve structure of the filled bag against the set of electrodes;

holding the filled bag against the set of electrodes until the polymer composition layers in the valve structure of the bag absorb enough RF energy from the electrodes to cause these polymer layers to join together by melting;

moving the clamping device to a second position to release the valve structure of the filled bag from the set of electrodes;

moving the transporting device to a second position to thereby carry the filled and sealed bag away from the sealer unit; and removing the filled and sealed bag from the transporting device.

2. The method of claim 1 in which the RF energy absorbed by the polymer composition layers from the electrodes has a frequency range of from about 1.0 to 300 MHz.

3. The method of claim 2 in which the RF energy absorbed by the polymer composition layers from the electrodes has a frequency of 40.65 MHz.

4. The method of claim 1 in which the polymer composition layers in the valve structure of the filled and sealed bag are made up of carbon monoxide-containing ethylene polymers.

5. A machine for filling a multiwall valve bag and for sealing the valve structure of the filled bag using electromagnetic energy in the radio frequency range (RF energy), the machine comprises:

means for filling the bag through the valve structure with a given material;

the valve structure of the filled bag includes at least two separated layers of a polymer composition capable of being heated by RF energy;

means for supporting the bag during filling and for settling the material in the bag during the filling step;

means for transporting the filled bag to a sealing unit and for removing the filled bag from the sealing unit;

means for transferring the filled bag from the supporting and settling means to the transporting means;

a sealing unit for sealing the valve structure of the filled bag;

the sealing unit includes an RF energy generator, a sealer head is mounted on the RF energy generator, a set of electrodes is mounted on one surface of the sealer head, and the electrodes carry RF energy supplied by said generator;

the sealing unit further includes a first jaw member and second jaw member, each jaw member is pivotally mounted on the sealer head; and wherein the jaw members assume a first position in which they clamp the valve structure of the filled bag against the set of electrodes and hold the bag in this position until the polymer composition layers in the valve structure of the filled bag absorb enough RF energy to cause these polymer layers to join together by melting, and the jaw members assume a second position in which they release the valve structure of the filled bag.

* * * * *